Nov. 26, 1940.  E. C. HUGHES  2,223,240
LAMINATED CELLULOSIC MATERIAL
Filed Oct. 19, 1937
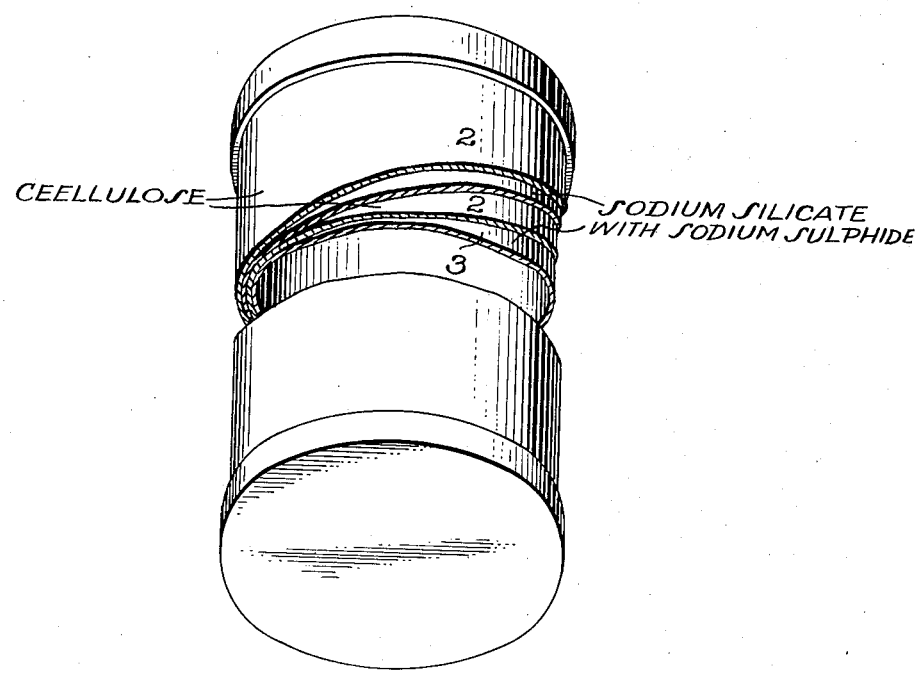
Inventor
Everett C. Hughes
By Oberlin, Limbach & Day
Attorney Patented Nov. 26, 1940

2,223,240

UNITED STATES PATENT OFFICE 2,223,240

LAMINATED CELLULOSIC MATERIAL

Everett C. Hughes, Cleveland, Ohio, assignor to The Standard Oil Company, Cleveland, Ohio, a corporation of Ohio Application October 19, 1937, Serial No. 169,836

9 Claims. (Cl. 154—46)

This invention relates to laminated materials, and it is among the objects of the invention to provide a material which although including sheet cellulose affords a barrier to oil and grease, and is capable of withstanding considerable mechanical stress, and yet may be quite flexible where desired. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

The sole figure is a broken perspective, partly in section, illustrating an embodiment of the invention.

In efforts heretofore to produce a laminated cellulose structure which is oil-resistant, particular use has been made of sodium silicate in conjunction with considerable proportions of such organic material as glycerol. While offering certain advantages, glycerol however introduces a considerable element of cost. I have now found that a particularly advantageous result in structures of the character here contemplated, may be had by materials more largely of inorganic character, such as sodium sulphide. Sodium sulphide compounded with sodium silicate, and preferably with a small amount of gum arabic, in association with cellulose, provides a layer which has remarkable oil-resistance and durability against tendencies to deterioration, notwithstanding drastic extremes in exposure. The sodium sulphide may be incorporated in amount of 10–30 per cent, depending somewhat upon the particular character and thickness of the cellulose layer and the usage to which it is to be subjected. The sodium sulphide desirably is the 62 per cent $Na_2S$ commercially known, and having a crystalline water content of three molecules. Where a somewhat thinner make-up solution with the sodium silicate is desired, the 30 per cent $Na_2S$ ($Na_2S.9H_2O$) can be used. With advantage also, the different sodium sulphides may be compounded together, and the consistency of the mixture may be controlled for consistencies as may be particularly desired in any given instance. The amount of gum arabic incorporated with the sodium silicate and sodium sulphide may be in general about 1 to 6 per cent, and it is usually most convenient to introduce this component as a solution. A solution of about 45 per cent of gum arabic is particularly convenient.

The sodium silicate may be the commercial grades having a 1:3.25 ratio of $Na_2O$ to $SiO_2$, or 1:2 ratio of $Na_2O$ to $Si_2O$. I have found however that the final effective ratio in the sodium silicate component as used, is of importance in the relative results. Preferably, sodium silicates of the different ratios may thus be compounded together, with a resultant provision of a ratio of $Na_2O$ to $SiO_2$ adjusted as desired, this being a simple and advantageous means for attaining any particular ratio, regardless of standard commercial ratio products normally available. Thus, the 1:2 ratio silicate may be mixed with the 1:3.25 ratio silicate stock, in amounts of 5 to 40 parts by weight of the former to 70–35 parts by weight of the latter. With the sodium silicate, the sodium sulphide and gum arabic are incorporated, as above-indicated, and this material is associated with the cellulose, forming an oil-proof layer or layers. The cellulose may be of such grade as desired for any particular usage, cheap grades of stock such as chip board, chestnut board, etc. being suitable for inexpensive products, and stocks such as kraft, or higher grades of stock such as rag stock etc. being applicable for more exacting usages, and one or more layers of the cellulose may be concerned, and one or more layers of the sodium silicate and sulphide, as desired. Thus, one or more layers of cellulose 2 as designated in the drawing may have the surface layer 3 of the oil-proof sodium silicate and sulphide. Not only may an oil-resistant surface layer be thus provided, but where laying together plies or a plurality layers of cellulose the sodium silicate and sulphide material may be employed as adhesive therebetween. The cellulose layers for instance may be laid up in the form of a hollow container or tube which may be cut up into container lengths, and be supplied with an inner surface of the oil-resistant material, and as indicated, the oil-resistant material may be employed as the lap glue adhesive on an inner ply or as the adhesive for a part or all of the plies of the tubing, wound spirally or convolutely. If desired, the outside may be left uncoated with the oil-resistant material so as to receive any other desired finish. The ends of such tubular containers may be closed by sheet metal heads crimped into place on the cellulose, the amorphous oil-resistant material as a surfacing especially favoring a tight closure therewith. Or, especially for units of not large size, the closure headers may be of laminated cellulose and amorphous oil-proofing material as described, the headers being glued into position by the sodium silicate and sulphide material.

Optionally, I may include a fraction of a per cent of liquid soap in the sodium silicate and sulphide mixture, such as a sodium or potassium oleate soap or the like. Amounts may desirably be 0.1 to 0.3 per cent. Thus, for example I may mix 60.5 per cent of sodium silicate of 1:3.25 $Na_2O$ to $SiO_2$ ratio with 17 per cent of sodium silicate of 1:2 ratio of $Na_2O$ to $SiO_2$, and dissolve therein 20 per cent of sodium sulphide (62 per cent grade), and incorporate 2.25 per cent of a 45 per cent gum arabic solution, and 0.25 per cent of liquid soap, all parts being by weight. After thorough mixture, the material is applied to cellulose to form a surface layer or inter-layer as desired.

As seen, water glass or sodium silicate as compounded with sodium sulphide, and optionally with one or other or both of the other substances as indicated, has remarkable properties as an adhesive and for other uses where water glass has been employed heretofore, and in general the present composition of water glass has superior characteristics for water glass usage.

Other modes of applying the principle of the invention may be employed, change being made as regards the details described, provided the features stated in any of the following claims, or the equivalent of such, be employed.

I therefore particularly point out and distinctly claim as my invention:

1. A laminated structure, comprising plural fibrous layers of sheet cellulose, and an oil-proof layer of sodium silicate containing a minor proportion of sodium sulphide on at least one exposed cellulose surface.

2. A laminated container structure, comprising layers of sheet cellulose and therebetween and on at least one exposed cellulose surface an oil-proof layer of sodium silicate modified by a minor proportion of sodium sulphide.

3. A laminated structure, comprising at least one layer of sheet cellulose, and an oil-proof layer of sodium silicate containing a minor proportion of sodium sulphide on at least one exposed face of the sheet cellulose.

4. A laminated structure suitable for containers, comprising a fibrous layer of sheet cellulose, and an oil-proof amorphous surface layer of sodium silicate softened by 10 to 30 per cent of sodium sulphide, 1 to 6 per cent of gum arabic, and not over 1 per cent of soap.

5. Oil and grease-proof material comprising sodium silicate containing a minor proportion of sodium sulphide.

6. Oil and grease-proof material comprising sodium silicate containing a minor proportion of sodium sulphide and a few per cent of gum arabic.

7. Oil and grease-proof material comprising sodium silicate with sodium sulphide 10 to 30 per cent, gum arabic 1 to 6 per cent, and soap in amount up to 1 per cent.

8. A container structure comprising wound-up laminations of sheet cellulose with an oil-proof layer therebetween and also on the inner exposed surface of sodium silicate containing a minor proportion of sodium sulphide.

9. A container structure comprising wound-up laminations of sheet cellulose with an oil-proof layer of sodium silicate containing a minor proportion of sodium sulphide as surfacing on the inside.

EVERETT C. HUGHES.